United States Patent [19]
Marston

[11] Patent Number: 5,778,923
[45] Date of Patent: Jul. 14, 1998

[54] ANTI-SEEPAGE SELF-GAUGING INFLATION VALVE SYSTEM

[76] Inventor: Philip William Marston, 28-B Packet Landing, Pembroke, Mass. 02359

[21] Appl. No.: 547,970

[22] Filed: Oct. 25, 1995

[51] Int. Cl.$^6$ .................................................. F16K 15/20
[52] U.S. Cl. .......................... 137/226; 137/228; 137/229
[58] Field of Search ........................ 137/224, 226, 137/227, 228, 229

[56] References Cited

U.S. PATENT DOCUMENTS

| | | | |
|---|---|---|---|
| 1,156,328 | 10/1915 | Thayer | 137/226 |
| 1,325,019 | 12/1919 | Hussey | 137/226 |
| 1,434,708 | 11/1922 | Kelsey | 137/226 |
| 1,724,063 | 8/1929 | Anderson | 137/226 X |
| 2,246,775 | 6/1941 | Anderson | 137/226 |
| 2,672,153 | 3/1954 | Kipp | 137/226 |
| 4,445,527 | 5/1984 | Leimbach | 137/226 |

FOREIGN PATENT DOCUMENTS

296651  5/1932  Italy .................................. 137/226

*Primary Examiner*—John Rivell
*Attorney, Agent, or Firm*—Iandiorio & Teska

[57] ABSTRACT

An anti-seepage, self-gauging inflation valve system includes an inlet port and an outlet port; a filler valve for introducing fluid under pressure from the inlet to the outlet port; a vent structure; an isolation chamber communicating with the vent structure; a gauging valve for sealing the chamber from the vent structure and automatically opening when the pressure in the chamber exceeds a predetermined level; an anti-seepage isolation valve for isolating the chamber from the outlet port; and an actuator device for opening the isolation valve to enable access between the gauging valve and the outlet port to vent pressure in excess of the predetermined level while the actuator device holds open the isolation valve.

22 Claims, 8 Drawing Sheets

ANTI-SEEPAGE SELF-GAUGING INFLATION VALVE SYSTEM

FIELD OF INVENTION

This invention relates to an anti-seepage, self-gauging inflation valve system, and more particularly to such a system which is compatible with existing tire inflation valves.

BACKGROUND OF INVENTION

Proper tire inflation is an important part of vehicle maintenance. Manufacturers perform extensive research to determine the optimum combination of tire size and inflation pressure in order to maximize vehicle ride quality, safety and performance, fuel economy, and expected tire tread life.

The process of proper tire inflation requires that the individual perform a number of operations. Because all of the pressure regulation devices found on the common garage air station equipment cannot be trusted to provide an acceptable level of accuracy, the individual utilizing the equipment must use a hand held pressure gauge to ascertain when each tire has been filled to its proper inflation point. This requires that the user perform a series of inflation and measurements until each tire has reached its proper pressure level. What should be a simple task can be a bit intimidating for the mildly mechanically inclined, and enough of a hassle for those who aren't, to cause them to neglect performing the proper inflation maintenance vehicles require. The exercise can become even more problematic when it must be done under conditions of darkness, cold, or inclement weather conditions. Ideally the task would simply require the person to attach a high pressure air source to the tire valve and let the valve determine when the proper pressure has been reached, while preventing over inflation of the tire by venting excess air to the atmosphere. Then, the process of tire inflation would be faster, less complicated, eliminate the need for an independent pressure gauge, and provide a more precise and user friendly alternative over the current approaches.

Over the years, many people have attempted to invent a valving device that would accomplish these aims. Some designs failed because they could not conform to the required packaging constraints needed for the device to be used everywhere that conventional valves are now used. Some designs would have been too costly to manufacture, and would require the marketplace to adapt its products and accessories to their new design. Supplemental to these substantial deficiencies, the one major drawback that has kept these design attempts from being accepted in the marketplace is the fact that none of them has a positive shut-off feature.

Past attempts created a tire valve that would automatically regulate tire pressure by venting excess pressure to atmosphere once the predetermined pressure was attained. Such a valve would function well during the initial tire filling procedure. But when the tires heat up they vent again. Any pressure surge within the tire caused by hitting potholes, irregular road surfaces, loading the trunk with heavy objects, or aggressive driving style, can also cause the valve to release air to the atmosphere. The result would be soft or flat tires in a short period of time.

The standard Schrader tire valve has stood the test of time because it performs its job extremely well under a variety of conditions, while being inexpensive and friendly toward mass production techniques. Therefore, in order for an improvement over the current technology to be acceptable it should provide all of the current valve qualities of form, fit, function and cost.

SUMMARY OF INVENTION

It is therefore an object of this invention to provide an improved anti-seepage, self-gauging inflation valve system.

It is a further object of this invention to provide such an improved anti-seepage, self-gauging inflation valve system which speeds the process of inflation.

It is a further object of this invention to provide such an improved anti-seepage, self-gauging inflation valve system which self-regulates to the proper preset pressure during inflation.

It is a further object of this invention to provide such an improved anti-seepage, self-gauging inflation valve system which when used for tire inflation positively prevents seepage or leakage due to pressure fluctuations due to, e.g., vehicle loading, temperature increases, or potholes.

It is a further object of this invention to provide such an improved anti-seepage, self-gauging inflation valve system which is simple in design, uses few parts and is easy to manufacture.

It is a further object of this invention to provide such an improved anti-seepage, self-gauging inflation valve system which can use a standard valve core, e.g., Schrader.

It is a further object of this invention to provide such an improved anti-seepage, self-gauging inflation valve system in which the self-regulating pressure level can be adjustable.

It is a further object of this invention to provide such an improved anti-seepage, self-gauging inflation valve system in which the self-regulating pressure level feature can be selectively disabled.

It is a further object of this invention to provide such an improved anti-seepage, self-gauging inflation valve system which avoids reliance on inaccurate, broken or missing regulators.

It is a further object of this invention to provide such an improved anti-seepage, self-gauging inflation valve system which avoids the need for hand-held gauges.

It is a further object of this invention to provide such an improved anti-seepage, self-gauging inflation valve system which is form, fit and function substitutable for existing tire valves.

The invention results from the realization that a truly effective and practical self-gauging inflation valve system which positively prevents seepage through unwanted self-regulation and is substitutable for conventional valves can be achieved using a self-gauging valve to vent excess pressure and using another isolation valve which is normally closed to isolate the self-gauging valve from over pressure but is operative during filling and at selected other times to allow access to the self-gauging valve to vent excess pressure.

This invention features an anti-seepage self-gauging inflation valve system including an inlet port and an outlet port. A filler valve introduces fluid under pressure from the inlet to the outlet port. There is a vent structure and an isolation chamber communicating with the vent structure. A gauging valve seals the chamber from the vent structure and automatically opens when the pressure in the chamber exceeds a predetermined level. An anti-seepage isolation valve isolates the chamber from the outlet port. An actuator device opens the isolation valve to enable access between the gauging valve and the outlet port to vent pressure in excess of the predetermined level while the actuator device holds open the isolation valve.

In a preferred embodiment the gauging valve may include spring means for holding the gauging valve closed until the predetermined level of pressure is reached. The actuator device may include a shaft for opening and closing the isolation valve. The shaft may extend through the isolation valve and may include a passage to the outlet port and the filler valve may be disposed in the passage. The gauging valve may be movable on the shaft and the spring means may resiliently interconnect the actuator device and the gauging valve. The actuator device may include stop means for setting the loading of the spring means by the actuator device and defining the predetermined level of pressure. The stop means may include adjustment means to vary the setting of the loading of the spring and the predetermined level of pressure. The filler valve and the actuator device may be interconnected for enabling the actuator device to open the isolation valve as the filler valve is opened. The force of the spring means may be equal to or less than the force required to operate a ball foot chuck. There may be limiter means for limiting the movement of the actuator device and disabling the self-gauging valve. There may also be means for shielding the vent structure.

The invention also features an anti-seepage, self-gauging inflation valve system which includes an inlet port and an outlet port and a tubular housing. An actuator device is slidable relative to the housing. The actuator device includes a passage extending from the inlet port to the outlet port. There is a vent structure and an isolation chamber in the housing communicating with the vent structure. There is a filler valve in the passage and a gauging valve for sealing the chamber from the vent structure and automatically opening when the pressure in the chamber exceeds a predetermined level. An anti-seepage isolation valve isolates the chamber from the outlet port and is responsive to the actuator device upon the opening of the filler valve for opening the isolation valve and interconnecting the chamber and the outlet port to vent pressure in excess of the predetermined level through the vent structure while the actuator device holds open the isolation valve.

In a preferred embodiment the gauging valve may include spring means for holding the gauging valve closed until the predetermined level of pressure is reached. The gauging valve may be movable on the shaft and the spring means may resiliently interconnect the actuator device and the gauging valve. The actuator device may include stop means for setting the loading of the spring means by the actuator device and defining the predetermined level of pressure. The stop means may include adjustment means to vary the setting of the loading of the spring and the predetermined level of pressure. The force of the spring means may be equal to or less than the force required to operate a ball foot chuck.

DISCLOSURE OF PREFERRED EMBODIMENT

Other objects, features and advantages will occur to those skilled in the art from the following description of a preferred embodiment and the accompanying drawings, in which:

Figure 1:
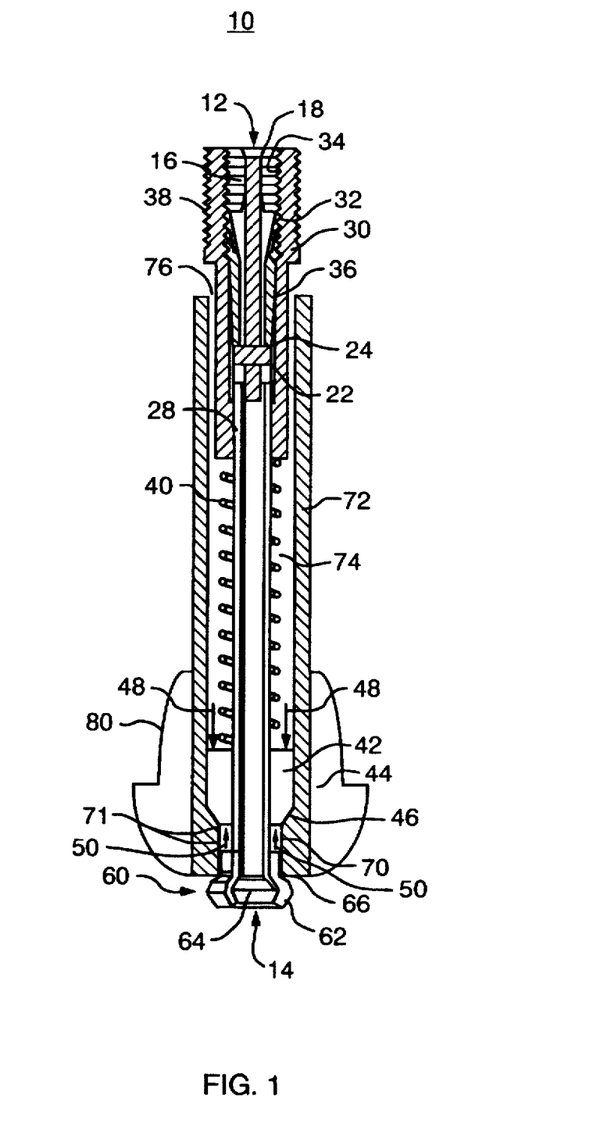
FIG. 1 is a side sectional elevational view of an anti-seepage self-gauging inflation valve system according to this invention in the closed position.

There is shown in FIG. 1 an anti-seepage self-gauging inflation valve system 10 according to this invention including an inlet port 12 and an outlet port 14. Filler valve 16, typically the standard Schrader valve core, has a pin 18 which when depressed against the force of a spring (not shown) which moves valve element 22 away from valve seat 24 to open Schrader valve core 16 and permit air under pressure to move from inlet 12 through counterbore 26 and shaft 28 of actuator 30 ultimately to outlet port 14. Schrader valve core 16 includes threads 32 which engage with internal threads 34 of actuator 30. Threads 32 and 34 as well as circumferential seal 36 serve to seal Schrader valve core 16 to actuator device 30. Threads 38 on the outside of actuator device 30 are the conventional threads which engage conventional tire valve caps and conventional tire valve screw-on filler attachments.

Mounted about shaft 28 is spring means 40 which applies a force between actuator 30 and valving element 42 of gauging valve 44 which determines the pressure at which valve element 42 will move away from the seat 46 of gauging valve 44. It is a combination of the downward force, arrow 48, exerted by spring 40, and the upward force, arrows 50, exerted by internal pressure, which causes valve 44 to operate. At the lower end of shaft 28 is anti-seepage isolation valve 60 which includes valving element or gasket 62 fitted about the flared end 64 of shaft 28, and valve seat 66 formed at the edge of bore 70 in tubular housing 72. A vent structure 74 is provided between housing 72 and shaft 28 and extending from valve 44 to the vent ports 76 and 78 at the top of housing 72. A typical elastomeric base 80 may be provided at the bottom of housing 72 for mounting in a conventional tire rim.

An isolation chamber 71 is formed in bore 70 between self-regulating valve 44 and isolation valve 60. Thus once the volume served by valve system 10, for example a tire, is filled, any excess of pressure in the tire, for example from hitting a bump, loading the trunk or increased temperature, cannot gain access to self-regulating valve 44 in order to vent the excess pressure to the vent structure 74 and out through vent ports 76 and 78. Instead that pressure will be maintained. It is only when actuator device 30 is moved downwardly to open the isolating valve so that its element 62 moves off seat 66 that self-regulating valve 46 becomes susceptible to any overpressure in the volume being inflated. This can occur either when actuator 30 is pushed down by a filling device or at other selected times when a downward force is deliberately applied to actuator 30.

Figure 2:
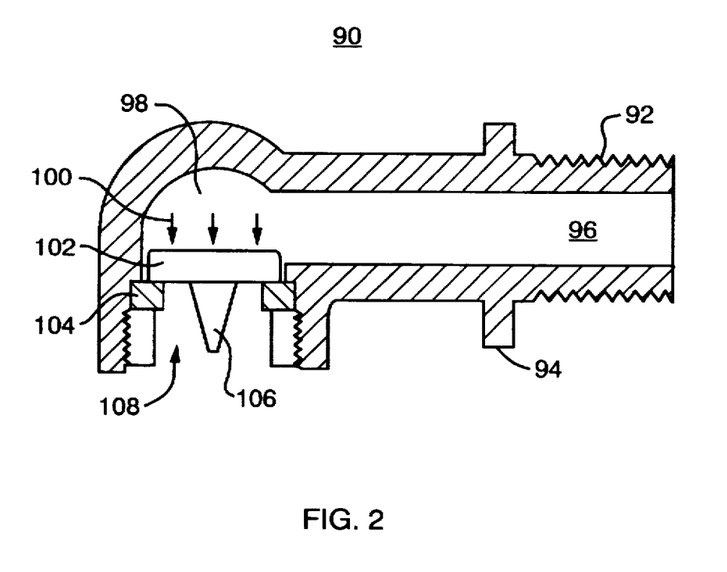
FIG. 2 is a side sectional view (with portions shown in phantom) of a standard ball foot chuck usable with this invention.

Inflation of valve system 10 is typically done through a conventional ball foot chuck 90, FIG. 2. Typically a threaded portion 92 or snap-fit device or other attachment device extends from hex nut section 94 to engage with a source of pneumatic pressure. The pneumatic pressure source supplies air through passage 96 to output chamber 98 where the pressure applies a force, arrows 100, tending to keep valving element 102 closed down against valve seat 104. The stem 106 of valving element 102 extends downwardly so that it can be engaged by the pin 18 of a typical Schrader valve core, FIG. 1, whose threaded portion 38 is received but not necessarily threadably engaged by port 108 in ball foot chuck 90.

The bottoming out of the valve core pin 18 against the valve core body 16 causes further engagement of the ball foot chuck 90 to overcome the resistance offered by the regulating spring 40. As spring 40 is compressed the actuator device 30 moves downwardly opening the isolation valve 60. Once the actuator device 30 has bottomed out to its fully depressed position, the further engagement of the ball foot chuck 90 overcomes the pressure, arrows 100, which keeps the valve element 102 in contact with its seat 104, allowing the pneumatic pressure source to gain access to the valve core and fill the tire.

Figure 3:
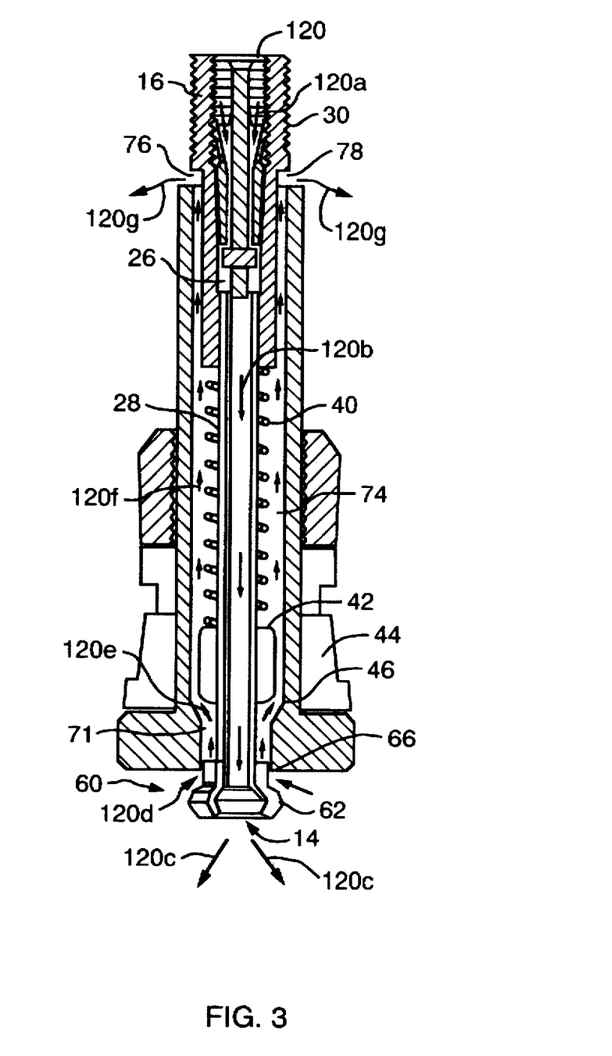
FIG. 3 is a view similar to FIG. 1 with the valve system according to this invention in the open condition during the fill mode.

In this condition, FIG. 3, Schrader valve 16 is open, permitting air from a high pressure source to enter, arrows 120, flow through the Schrader valve, out of it, arrows 120a, into counterbore 26, and from there through hollow shaft 28, arrows 120b. The air then exits outlet port 14, arrows 120c, to fill the volume to be pressurized. The downward force of actuator device 30 provides loading of spring 40 that brings the force on valve element 42 to the level required to keep it shut until a predetermined level of pressure, for example 32 pounds per square inch, is reached. When that happens, isolation valve element or gasket 62 is moved away from isolation valve seat 66 so that the pressure in the volume, for example, the tire, being filled through outlet 14 now gains access to isolation chamber 71. Thus as soon as the pressure being supplied through outlet port to the tire exceeds a predetermined level the force on self-gauging valve element 42 will be sufficient to lift it from its seat 46 and allow that excess pressure to move upward, arrows 120d, between isolation valve element 62 and its seat 66 and between self-regulating valve element 42 and its seat 46, arrows 120e, through the vent structure 74, arrows 120f and out vent reliefs 76 and 78, arrows 120g.

The clearances between all parts that have an effect on the flow of fluid in both the filling of the tire and the venting of the excess pressure, are such that there is produced a flow area that meets or exceeds the flow area of a conventional valve so that for example, a tire fitted with the device of the invention can be as easily and quickly filled as a tire fitted with a conventional Schrader valve.

Once the filling cycle is over and ball foot chuck 90, FIG. 2, is removed from housing 30, isolation valve 60, FIG. 3, will close and once again protect self-regulating valve 44 from responding to any over-pressure experienced at outlet port 14 and the surrounding volume.

Figure 4:
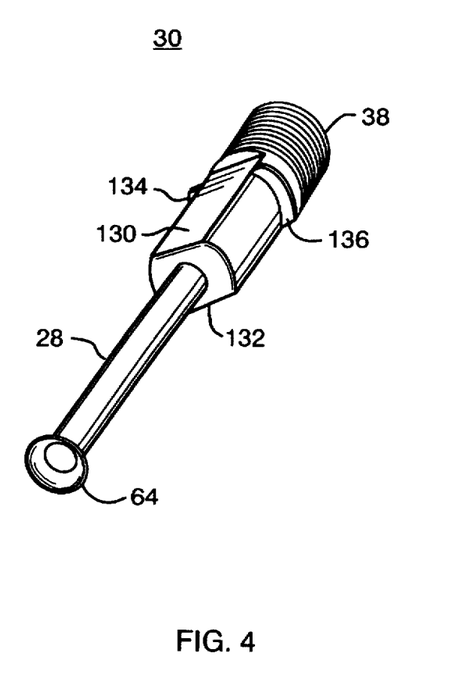
FIG. 4 is a three-dimensional view of the actuator device of FIG. 1.
Figure 5:
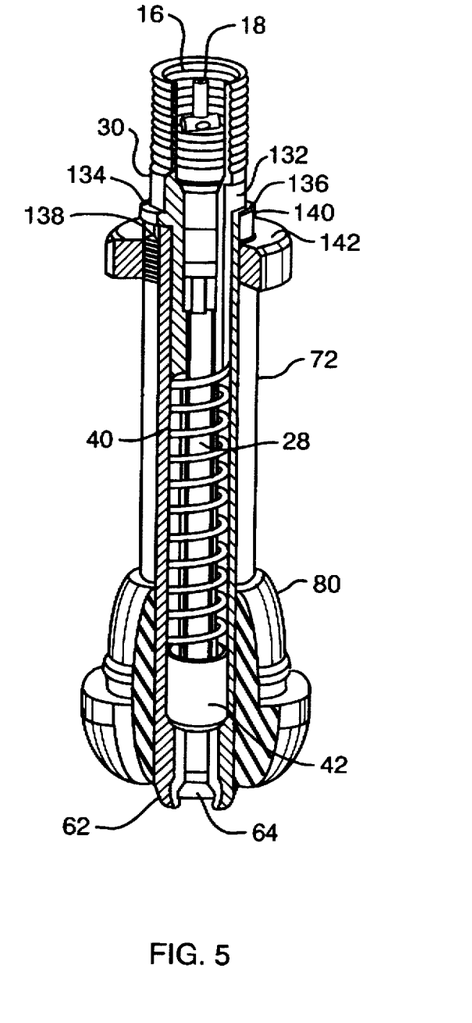
FIG. 5 is a three-dimensional view with parts broken away of the valve system of FIG. 1 showing the adjustment means for presetting the predetermined pressure at which the system will self-regulate.

Actuator device 30, FIG. 4, includes two flat sides 130, 132 which cooperate with housing 72, FIG. 1, to form the vent ports 76 and 78. Actuator 30, FIG. 4, also includes detents 134 and 136 which extend into slots 138 and 140, FIG. 5, so that when actuator 30 is pushed down detents 134 and 136 will be stopped at the bottom of slots 138, 140, thus establishing a predetermined loading of the spring which establishes the predetermined pressure level at which the self-regulating valve 44 will open. The engagement of detents 139 and 136 into slots 138 and 140 also provides a means of preventing rotation of the actuator 30 about its longitudinal axis, in order to simplify the attachment of threaded objects to the threads 38 on the outside of actuator 30. If it is desirable the predetermined pressure level at which the self-regulating valve 44 opens can be adjusted, for example, by using an adjustment ring 142 whose threads 141 engage with threads 144 on the outside of housing 72. As ring 142 is threaded upwardly on threads 144 it provides a platform which will arrest the downward motion of detents 134 and 136 before they reach the bottom of slots 138 and 140. This prevents the full depression of actuator 30 and thereby limits the compression of spring 40. This in turn limits the amount of force applied by spring 40 to valve element 42 so that its self-regulating pressure level will be lowered. Downward adjustment of ring 142, conversely, increases the loading of spring 40 and the self-regulating pressure level.

Figure 6:
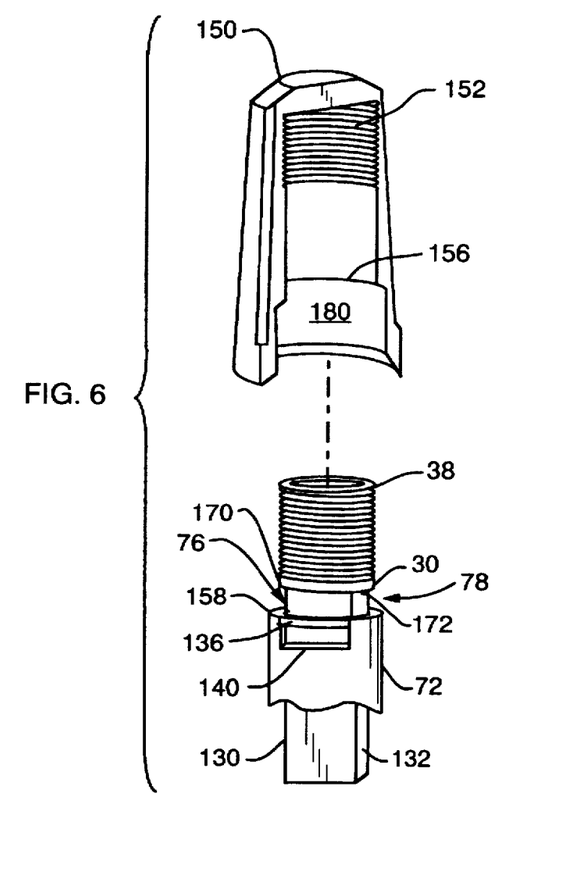
FIG. 6 is an exploded three-dimensional partially broken away, partially sectional view of the valve of FIG. 1 showing a valve cap which functions to limit the self-regulating action and to shield the vent structure.

The movement of actuator device 30 to open isolation valve 60 and thus enable operation of gauging valve 44 can be prevented by means of safety cap 150 which has internal threads 152 that engage with external threads 38 on device 30. With device 30 thus engaged with cap 150 and the lower flange 156 of cap 150 resting on the upper lip 158 of housing 72, movement of actuator device 30 is prevented. That is, since flange 156 of cap 150 is resting on lip 158, cap 150 cannot be moved farther downwardly, and since the threads 152 in cap 150 are engaged with the threads 38 on actuator device 30, actuator device 30 also cannot move downwardly; therefore isolation valve 60 cannot be opened.

Figure 7:
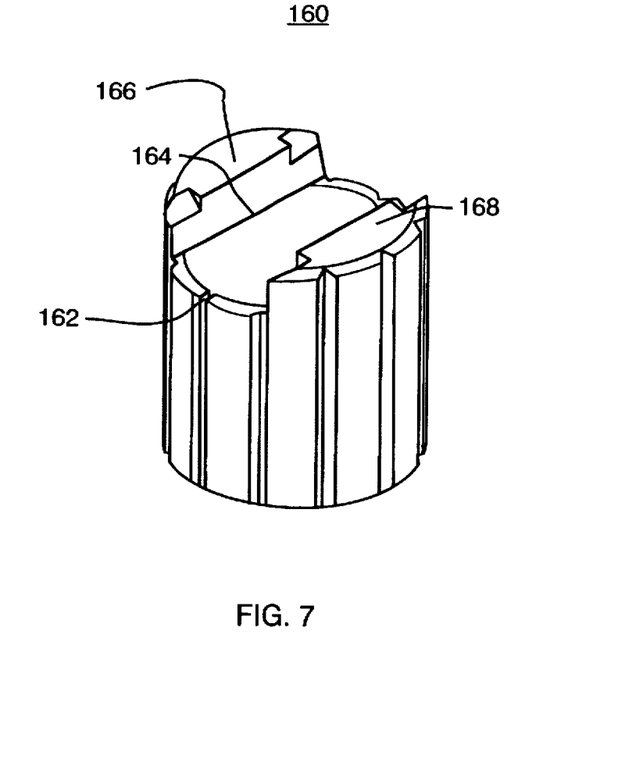
FIG. 7 is a three-dimensional view of another embodiment of the limiter according to this invention.

This limiting action can also be achieved with limiter collar 160, FIG. 7. Collar 160 contains a split 162 which enables it to be wrapped around actuator device 30 so that the inside edge 164 of limiter 160 rests on the top lip 158 of housing 72. Two plateaus 166 and 168 of split collar 160 then rest under the overhangs 170, 172 of actuator device 30 where it is undercut by flat sides 130, 132. Once again, in this condition actuator device 30 cannot be moved downwardly and so isolation valve 60 cannot be opened. When it is desirable to shield vent ports 76 and 78 and the surrounding area from dirt and debris, a shield can be applied such as shield 180, FIG. 6, which extends downwardly from and circumferentially around flange 156 of cap 150. When cap 150 is in place shield 180 covers outlet ports 76 and 78, detents 134 and 136 and slots 138 and 140.

Figure 8:
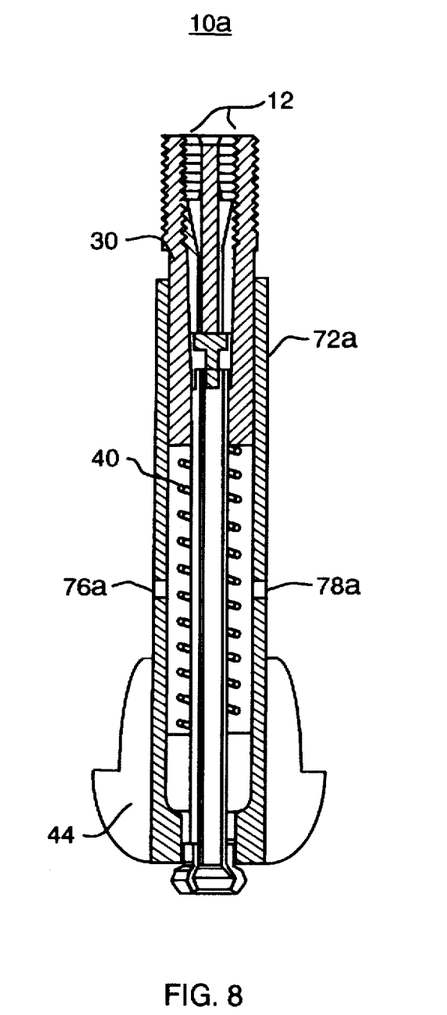
FIG. 8 is a view similar to FIG. 1 showing an alternative form of the vent structure.

Although the vent structure has been shown as two parallel channels which extend up inside of housing 72 and gain access to the atmosphere through vent ports 76 and 78 alongside actuator device 30, this is not a necessary limitation of the invention. For example, as shown in FIG. 8, valve system 10a may have its vent ports 76a and 78a located as holes or drills in the side of housing 72a closely proximate gauging valve 44.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. An anti-seepage, self-gauging inflation valve system comprising:

a base for mounting in a device to be inflated;

an inlet port and an outlet port, said outlet port proximate said base;

a filler valve for introducing fluid under pressure from said inlet to said outlet port;

a vent structure;

an isolation chamber communicating with said vent structure;

an actuator device;

a gauging valve including spring means resiliently interconnecting said actuator device and said gauging valve for holding said gauging valve closed to seal said chamber from said vent structure and automatically opening when the pressure in said chamber exceeds a predetermined level; and an anti-seepage isolation valve for isolating said chamber from said outlet port;

said actuator device opening said isolation valve to enable access between said gauging valve and said outlet port to vent pressure in excess of said predetermined level while said actuator device holds open said isolation valve.

2. The anti-seepage, self-gauging inflation valve system of claim 1 in which said actuator device includes a shaft for opening and closing said isolation valve.

3. The anti-seepage, self-gauging inflation valve system of claim 2 in which said shaft extends through said isolation valve and includes a passage to said outlet port and said filler valve is disposed in said passage.

4. The anti-seepage, self-gauging inflation valve system of claim 2 in which said gauging valve is movable on said shaft.

5. The anti-seepage, self-gauging inflation valve system of claim 1 in which said actuator device includes stop means for setting the loading of said spring means by said actuator device and defining said predetermined level of pressure.

6. The anti-seepage, self-gauging inflation valve system of claim 5 in which said stop means includes adjustment means to vary the setting of the loading of the spring and said predetermined level of pressure.

7. The anti-seepage, self-gauging inflation valve system of claim 1 in which said filler valve and said actuator device are interconnected for enabling said actuator device to open said isolation valve as said filter valve is opened.

8. The anti-seepage, self-gauging inflation valve system of claim 1 in which the force of said spring means is equal to or less than the force required to operate a ball foot chuck.

9. The anti-seepage, self-gauging inflation valve system of claim 1 further including limiter means for limiting radial and axial movement of said actuator device and disabling said gauging valve.

10. The anti-seepage, self-gauging inflation valve system of claim 1 further including means for simultaneously shielding said vent structure and locking said actuator to thereby prevent debris from entering said vent structure and simultaneously preventing inadvertent operation of said actuator device.

11. An anti-seepage, self-gauging inflation valve system comprising:

a base for mounting in a device to be inflated;

an inlet port and an outlet port, said outlet port proximate said base;

a tubular housing;

an actuator device slidable relative to said housing, said actuator device including a passage extending from said inlet port to said outlet port;

a vent structure;

an isolation chamber in said housing communicating with said vent structure;

a filler valve in said passage;

a gauging valve including spring means resiliently interconnecting said actuator device and said gauging valve for holding said gauging valve closed to seal said chamber from said vent structure and automatically opening when the pressure in said chamber exceeds a predetermined level, said gauging valve being movable on said actuator device; and an anti-seepage isolation valve for isolating said chamber from said outlet port and responsive to said actuator device upon opening of said filler valve for opening said isolation valve and interconnecting said chamber and said outlet port to vent pressure in excess of said predetermined level through said vent structure while said actuator device holds open said isolation valve.

12. The anti-seepage, self-gauging inflation valve system of claim 11 in which said actuator device includes stop means for setting the loading of said spring means by said actuator device and defining said predetermined level of pressure.

13. The anti-seepage, self-gauging inflation valve system of claim 12 in which said stop means includes adjustment means to vary the setting of the loading of the spring and said predetermined level of pressure.

14. The anti-seepage, self-gauging inflation valve system of claim 11 in which the force of said spring means is equal to or less than the force required to operate a ball foot chuck.

15. An anti-seepage, self-gauging inflation valve system comprising:

an inlet port and an outlet port;

a filler valve for introducing fluid under pressure from said inlet to said outlet port;

a vent structure;

an isolation chamber communicating with said vent structure;

a gauging valve for sealing said chamber from said vent structure and automatically opening when the pressure in said chamber exceeds a predetermined level;

an anti-seepage isolation valve for isolating said chamber from said outlet port;

an actuator device for opening said isolation valve to enable access between said gauging valve and said outlet port to vent pressure in excess of said predetermined level while said actuator device holds open said isolation valve; and limiter means for limiting radial and axial movement of said actuator device and disabling said gauging valve.

16. An anti-seepage, self-gauging inflation valve system comprising:

an inlet port and an outlet port;

a filler valve for introducing fluid under pressure from said inlet to said outlet port;

a vent structure;

an isolation chamber communicating with said vent structure;

a gauging valve for sealing said chamber from said vent structure and automatically opening when the pressure in said chamber exceeds a predetermined level;

an anti-seepage isolation valve for isolating said chamber from said outlet port; and an actuator device including a shaft for opening said isolation valve to enable access between said gauging valve and said outlet port to vent pressure in excess of said predetermined level while said actuator device holds open said isolation valve, said shaft extending through said isolation valve and including a passage to said outlet port, said filler valve disposed in said passage.

17. An anti-seepage, self-gauging inflation valve system comprising:

an inlet port and an outlet port;

a filler valve for introducing fluid under pressure from said inlet to said outlet port;

a vent structure;

an isolation chamber communicating with said vent structure;

a gauging valve for sealing said chamber from said vent structure and automatically opening when the pressure in said chamber exceeds a predetermined level, said gauging valve including spring means for holding said gauging valve closed until said predetermined level of pressure is reached;

an anti-seepage isolation valve for isolating said chamber form said outlet port; and an actuator device for opening said isolation valve to enable access between said gauging valve and said outlet port to vent pressure in excess of said predetermined level while said actuator device holds open said isolation valve, said spring means resiliently interconnecting said actuator device and said gauging valve.

18. An anti-seepage, self-gauging inflation valve system comprising:

an inlet port and an outlet port;

a tubular housing;

an actuator device slidable relative to said housing; said actuator device including a passage extending from said inlet port to said outlet port;

a filler valve in said passage;

a vent structure;

an isolation chamber in said housing communicating with said vent structure;

a gauging valve for sealing said chamber from said vent structure and automatically opening when the pressure in said chamber exceeds a predetermined level, said gauging valve including spring means for holding said gauging valve closed until said predetermined level of pressure is reached, said gauging valve being movable on said actuator device and said spring means resiliently interconnecting said actuator device and said gauging valve; and an anti-seepage isolation valve for isolating said chamber from said outlet port and responsive to said actuator device upon opening of said filler valve for opening said isolation valve and interconnecting said chamber and said outlet port to vent pressure in excess of said predetermined level through said vent structure while said actuator device holds open said isolation valve.

19. An anti-seepage, self-gauging inflation valve system comprising:

an inlet port and an outlet port;

a filler valve for introducing fluid under pressure from said inlet to said outlet port;

a vent structure;

an isolation chamber communicating with said vent structure;

a gauging valve for sealing said chamber from said vent structure and automatically opening when the pressure in said chamber exceeds a predetermined level;

an anti-seepage isolation valve for isolating said chamber for said outlet port; and an actuator device for opening said isolation valve to enable access between said gauging valve and said outlet port to vent pressure in excess of predetermined level while said actuator device holds open said isolation valve, said actuator device interconnected with a single spring for simultaneously opening said filler valve in response to said actuator device and also opening said gauging valve when the pressure in said chamber exceeds a predetermined level.

20. An anti-seepage, self-gauging inflation valve system comprising:

a base for mounting in a device to be inflated;

an inlet port and an outlet port, said outlet port proximate said base;

a filler valve for introducing fluid under pressure from said inlet to said outlet port;

a vent structure;

an isolation chamber communicating with said vent structure;

a gauging valve for sealing said chamber from said vent structure and automatically opening when the pressure in said chamber exceeds a predetermined level;

an anti-seepage isolation valve for isolating said chamber from said outlet port; and an actuator device including a shaft extending through said isolation valve and including a passage to said outlet port for opening and closing said isolation valve to enable access between said gauging valve and said outlet port to vent pressure in excess of said predetermined level while said actuator device holds open said isolation valve.

21. An anti-seepage, self-gauging inflation valve system comprising:

a base for mounting in a device to be inflated;

an inlet port and an outlet port, said outlet port proximate said base;

a filler valve for introducing fluid under pressure from said inlet to said outlet port;

a vent structure;

an isolation chamber communicating with said vent structure;

a gauging valve for sealing said chamber from said vent structure and automatically opening when the pressure in said chamber exceeds a predetermined level;

an anti-seepage isolation valve for isolating said chamber from said outlet port;

an actuator device for opening said isolation valve to enable access between said gauging valve and said outlet port to vent pressure in excess of said predetermined level while said actuator device holds open said isolation valve; and limiter means for limiting radial and axial movement of said actuator device and disabling said gauging valve.

22. An anti-seepage, self-gauging inflation valve system comprising:

a base for mounting in a device to be inflated;

an inlet port and an outlet port, said outlet port proximate said base;

a filler valve for introducing fluid under pressure from said inlet to said outlet port;

a vent structure;

an isolation chamber communicating with said vent structure;

a gauging valve for sealing said chamber from said vent structure and automatically opening when the pressure in said chamber exceeds a predetermined level;

an anti-seepage isolation valve for isolating said chamber from said outlet port;

an actuator device for opening said isolation valve to enable access between said gauging valve and said outlet port to vent pressure in excess of said predetermined level while said actuator device holds open said isolation valve; and means for simultaneously shielding said vent structure and locking said actuator to thereby prevent debris from entering said vent structure and simultaneously preventing inadvertent operation of said actuator device.

* * * * *